Patented Mar. 17, 1936

2,034,020

UNITED STATES PATENT OFFICE 2,034,020

COMPOSITION OF MATTER

Leonard E. Branchen, Rochester, N. Y., assignor of one-half to Carbide & Carbon Chemicals Corporation and one-half to Eastman Kodak Company, corporations of New York No Drawing. Application May 24, 1932,
Serial No. 613,334

13 Claims. (Cl. 134—26)

This invention is directed to a composition which is useful in forming composite moistureproof materials comprising sheets or films composed essentially of cellulose organic esters together with a moistureproofing composition containing propylene dichloride and vinyl resins, that is, resinous products resulting from the polymerization of certain vinyl compounds.

Sheets or films of cellulose organic esters, such as cellulose acetate, cellulose propionate, cellulose butyrate and mixed esters, such as cellulose acetate propionate, cellulose acetate butyrate and cellulose acetate stearate, possess useful properties and have been proposed for various applications. Such films, however, possess certain properties which somewhat limit their range of usefulness. For example, the films of these cellulose organic esters are not as hard, as chemically resistant, or as resistant to moisture as may be desired for some purposes. Also, these cellulose organic esters have a comparatively narrow range of solubility, thus it is difficult to incorporate substances therewith which will impart properties to these materials which will make them practically useful for those applications from which they may be barred by the above-mentioned properties.

It has been discovered that the foregoing limitations can be largely overcome and that a new material can be formed by making a composite material comprising sheets or films composed essentially of cellulose organic esters together with one or more laminæ or surface coatings of a moistureproofing composition containing vinyl resins. This product is not a part of my invention having been invented by Charles R. Fordyce and Harold F. Robertson, and described and claimed in their application Ser. No. 613,333, filed May 24, 1932.

Surfaces containing vinyl resins are resistant to moisture, chemically inert, and form protective coatings which are hard and brilliant. In addition, vinyl resins are miscible with many modifying agents, such as gums, waxes, plasticizing materials, and other resins, and such modifying materials may be incorporated therewith to vary the properties of the vinyl resins for specific uses without greatly altering the advantageous qualities of the resins set forth above. The final product may be transparent, translucent, opaque, or colored as desired, such modifications being secured by varying the constitution of the moistureproofing composition.

The principal object of my invention is to provide a novel composition of matter comprising propylene dichloride and vinyl resins which is useful for making the hereindescribed composite moistureproof articles.

In forming composite moistureproof materials of the class contemplated by this invention it is necessary to provide a liquid composition containing the moistureproofing materials, and to apply this composition to the cellulose organic ester sheet or film, thereafter eliminating the liquid to leave a coating on the base sheet or film which will render it impervious to moisture. It is at once apparent that the nature of the liquids in the composition is of extreme importance, and that the liquid must possess certain definite properties. It must be a good solvent for the ingredients of the moistureproofing composition, it must be substantially a non-solvent for the base sheet or film of cellulose organic ester (by which is meant that the base sheet shall not be attacked by the solvent to an extent which will permit the base sheet to stretch or be deformed), the solvent must be volatile enough to be readily eliminated from the coating, it must be reasonable in price, and it must be capable of blending with diluents and other solvents which may be desirable in the composition.

I have discovered by test that the object of the invention may be attained, and that compositions meeting the foregoing qualifications may be prepared with the use of propylene dichloride. Propylene dichloride, $CH_3.CHCl.CH_2Cl$, is a stable liquid which boils at 96.8° C., and which has a specific gravity of 1.16 at 15° C. This compound is an excellent solvent for vinyl resins, but does not dissolve cellulose organic esters readily. At ordinary temperatures it will not attack cellulose acetate, cellulose acetate propionate or cellulose acetate butyrate. It has somewhat greater solvent power for the other above-named cellulose organic esters, but since it is miscible with a large variety of diluents, inert liquids and other solvents, any given composition may be readily adjusted to form one which will not attack a particular base sheet or film. Above about 50° C. propylene dichloride begins to attack all of the cellulose organic esters, and becomes a more active solvent therefor with succeeding increases in temperature.

Cellulose acetate of the acetone-soluble type is preferred as the base to which my invention is applied, but other forms of cellulose acetate and the other cellulose organic esters mentioned may be used. The cellulose organic ester forming the base sheet or film may include the usual and known plasticizers or modifiers therefor.

Vinyl resins suitable for use in forming the composition of my invention may be formed from vinyl esters by known polymerization processes. The polymerization products of inorganic vinyl esters, such as vinyl halides, or those of organic vinyl esters, such as vinyl esters of aliphatic acids, may be used. I prefer to use vinyl resins resulting from the conjoint polymerization (by which is meant polymerization of a plurality of compounds while in mutual contact) of two or more vinyl esters. For example, vinyl resins having desirable properties may be prepared by the conjoint polymerization of a vinyl halide and a vinyl ester of an aliphatic acid. Products of the conjoint polymerization of vinyl chloride and vinyl acetate in proportions ranging from about 70% to 90% by weight of the chloride are particularly desirable. Such resins are substantially water-white and transparent, and they are tough, resilient and exceptionally resistant to acids, alkalies and salts, and they are unaffected by common solvents, such as water, alcohol and the like. The preferred vinyl resins may be formed, for example, by causing a mixture of about 80% by weight of vinyl chloride and about 20% by weight of vinyl acetate to be polymerized in the presence of a suitable liquid medium, such as the aliphatic alcohols, ketones, or paraffin hydrocarbons, and in the presence of a polymerizing catalyst, such as dibenzoyl peroxide, at a temperature below about 60° C. The vinyl resins and processes of making them are not a part of my invention.

Many modifications of my invention are possible. It may comprise a 5% to 10% solution of vinyl resin in propylene dichloride or a mixture of propylene dichloride and toluene, or it may be composed of a vinyl resin together with a large variety of modifying materials for altering the properties of the composition all dissolved in propylene dichloride, with or without a diluent or inert solvent, or an additional solvent.

The properties and characteristics of my moisture-proofing composition are governed by the choice of ingredients and proportions thereof in the composition. For example, waxes, plasticizers, gums, and resins other than vinyl resins, may be incorporated in the propylene dichloride-vinyl resin composition to vary its properties as desired. The appearance of the composite product may be enhanced by adding coloring materials, especially oil-soluble dyes, to the composition.

The solid content of the compositions may comprise up to about 45% by weight of a wax, up to about 20% by weight of a gum, up to about 25% by weight of a plasticizer, with the balance of the solids being a vinyl resin. This is made up as a 5% to 20% by weight solution in a solvent mixture containing about 20% by volume or more of propylene dichloride together with a diluent, such as toluene. Within the above limits, I prefer to have the solids in the new compositions composed of about 55% to 85% by weight of vinyl resin, about 2% to 10% by weight of high melting paraffin wax, about 5% to 20% by weight of a gum, and from 0 to about 15% by weight of a plasticizer.

Suitable waxes are paraffin wax, ceresin wax, Japan wax, spermaceti wax, wax-like derivatives of halogenated naphthalene, and carnauba wax. The wax and amount thereof to be used is dependent upon its water resistance and compatibility with the other components of the composition. I prefer to use a high melting (above about 50° C.) paraffin wax, or a wax which contains higher paraffin hydrocarbons, such as ceresin wax, and in which case the wax content of the total solids is preferably from about 2% to 10% by weight.

The gum or resin to be used must be compatible with vinyl resins, and the other ingredients of the composition. Ester gums, and various modifications thereof and certain phenol-formaldehyde resins, especially those of the oil-soluble variety are suitable gums and resins. Ester gums are preferred, and these are especially suitable in the oxidized state. The method of oxidation may be any convenient known method.

The use of plasticizers is optional, but in many cases the flexibility, resilience and strength of the compositions are improved by the use of plasticizers. Plasticizers which are compatible with both vinyl resins and cellulose organic esters are preferred, but this is not an essential property of the plasticizer. Typical satisfactory plasticizers are di(beta-butoxyethyl) phthalate, diesters of ethylene and polyethylene glycol monoalkyl ethers with phthalic acid, phthalic acid esters of the lower aliphatic alcohols, and the like.

Other substances may be added to the compositions to produce certain specific effects. Thus, anthracene or phenanthrene may be added to increase the brilliancy and lustre of the coating produced from the composition.

The moistureproofing composition may be applied to the cellulose acetate sheets in any desired manner. The mode of forming the composite product is not a part of my invention. However, since propylene dichloride begins to attack cellulose acetate and other cellulose organic esters above about 50° C. it is necessary to apply the composition below this temperature to prevent stretching or weakening of the film being coated.

The solvent may be composed solely of propylene dichloride, but for the purpose of economy it is generally preferable to use a diluent with the propylene dichloride. For this purpose toluene, xylene, benzene, ethyl benzene, gasoline, alcohol or the like may be used. The additional liquids or diluents must be such that the final solvent composition remains substantially a non-solvent for cellulose organic esters. The diluents cited are non-solvents for most vinyl resins, but vinyl resin solvents which are not solvents for cellulose organic esters, such as butyl acetate, may be used.

The following is an example of one composition illustrative of my invention:

| | Percent by weight |
|---|---|
| Vinyl resin | 73 |
| Di(beta-butoxyethyl) phthalate | 20 |
| Oxidized ester gum | 5 |
| Paraffin wax (54° C.) | 2 |

The above solids were dissolved in a mixture composed of 35% by volume propylene dichloride and 65% by volume toluene to form a solution containing about 10% by weight of solids. The moistureproofing qualities of the composition are shown by the following data:

A sheet of cellulose acetate 0.0009 inch in thickness was drawn through the composition and dried. The coating so obtained increased the thickness of the sheet to 0.001 inch. The rate of the moisture transmission through the coated sheet was 0.008 milligram of moisture per square centimeter per hour, while the rate of transmission through the original sheet before coating was 3.0 to 3.5 milligrams per square centimeter per hour.

I claim:

1. A composition of matter adapted to produce tough, hard, flexible, adherent moistureproof films on materials coated therewith, said composition comprising a polymerized vinyl ester resin dissolved in a solvent which will not materially attack cellulose lower fatty acid esters and which comprises a substantial proportion of propylene dichloride.

2. A composition of matter adapted to produce tough, hard, flexible, adherent moistureproof films on materials coated therewith, said composition comprising a polymerized vinyl ester resin dissolved in a solvent which comprises a substantial proportion of propylene dichloride, together with another liquid which does not render said solvent capable of dissolving cellulose lower fatty acid esters.

3. A composition of matter adapted to produce tough, hard, flexible, adherent moistureproof films on materials coated therewith, said composition comprising a polymerized vinyl ester resin and a wax dissolved in a solvent which will not materially attack cellulose lower fatty acid esters and which comprises a substantial proportion of propylene dichloride.

4. A composition of matter adapted to produce tough, hard, flexible, adherent moistureproof films on materials coated therewith, said composition comprising a polymerized vinyl ester resin, a wax and a gum dissolved in a solvent which will not materially attack cellulose lower fatty acid esters and which comprises a substantial proportion of propylene dichloride.

5. A composition of matter adapted to produce tough, hard, flexible, adherent moistureproof films on materials coated therewith, said composition comprising a polymerized vinyl ester resin, a wax, and a plasticizer dissolved in a solvent which will not materially attack cellulose lower fatty acid esters and which comprises a substantial proportion of propylene dichloride.

6. A composition of matter adapted to produce tough, hard, flexible, adherent moistureproof films on materials coated therewith, said composition comprising a polymerized vinyl ester resin, a wax, a gum, and a plasticizer dissolved in a solvent which will not materially attack cellulose lower fatty acid esters and which comprises a substantial proportion of propylene dichloride.

7. A composition of matter adapted to produce tough, hard, flexible, adherent moistureproof films on materials coated therewith, said composition comprising a polymerized vinyl ester resin, a wax, a plasticizer, a gum, and an additional modifying substance dissolved in a solvent which will not materially attack cellulose lower fatty acid esters and which comprises a substantial proportion of propylene dichloride.

8. A composition of matter adapted to produce tough, hard, flexible, adherent moistureproof films on materials coated therewith, said composition comprising a vinyl resin substantially identical with a vinyl resin resulting from the conjoint polymerization of a vinyl halide and vinyl ester of an aliphatic acid, a wax, which contains a substantial proportion of higher paraffin hydrocarbons, a plasticizer, and a gum dissolved in a solvent which will not materially attack cellulose lower fatty acid esters and which comprises a substantial proportion of propylene dichloride.

9. A composition of matter adapted to produce tough, hard, flexible, adherent moistureproof films on materials coated therewith, said composition comprising a vinyl resin substantially identical with a vinyl resin resulting from the conjoint polymerization of vinyl chloride and vinyl acetate, a wax which contains a substantial proportion of higher paraffin hydrocarbons, a plasticizer and a gum dissolved in a solvent which will not materially attack cellulose lower fatty acid esters and which comprises a substantial proportion of propylene dichloride.

10. A composition of matter adapted to produce tough, hard, flexible, adherent moistureproof films on materials coated therewith, said composition comprising a vinyl resin substantially identical with a vinyl resin resulting from the conjoint polymerization of about 80% by weight of vinyl chloride and about 20% by weight of vinyl acetate, a wax which contains a substantial proportion of higher paraffin hydrocarbons, a plasticizer and a gum dissolved in a solvent which will not materially attack cellulose lower fatty acid esters and which comprises a substantial proportion of propylene dichloride.

11. A composition of matter adapted to produce tough, hard, flexible, adherent moistureproof films on materials coated therewith, said composition comprising from about 55% to about 85% by weight of a polymerized vinyl ester resin, from about 2% to about 45% by weight of a wax, from about 5% to about 20% by weight of a gum, and from up to about 25% by weight of a plasticizer dissolved in a solvent which will not materially attack cellulose lower fatty acid esters and which comprises a substantial proportion of propylene dichloride.

12. A composition of matter adapted to produce tough, hard, flexible, adherent moistureproof films on materials coated therewith, said composition comprising from about 55% to about 85% by weight of a vinyl resin substantially identical with a vinyl resin resulting from the conjoint polymerization of about 80% by weight of vinyl chloride and about 20% by weight of vinyl acetate, from about 2% to about 10% by weight of high melting paraffin wax, from about 5% to about 20% by weight of oxidized ester gum, and from up to about 15% by weight of di(beta-butoxyethyl) phthalate dissolved in a solvent which will not materially attack cellulose lower fatty acid esters and which comprises a substantial proportion of propylene dichloride.

13. A composition of matter adapted to produce tough, hard, flexible, adherent moistureproof films on materials coated therewith, said composition comprising about 55% to 85% by weight of a vinyl resin substantially identical with a vinyl resin resulting from the conjoint polymerization of about 80% by weight of vinyl chloride and 20% by weight of vinyl acetate; about 2% to about 10% by weight of paraffin wax which melts above about 50° C.; about 5% to about 20% by weight of oxidized ester gum; and from up to about 15% by weight of di(beta-butoxyethyl) phthalate dissolved in a solvent composed of about 35% by volume of propylene dichloride and about 65% by volume of toluene.

LEONARD E. BRANCHEN.

CERTIFICATE OF CORRECTION.

Patent No. 2,034,020.  March 17 1936.

LEONARD E. BRANCHEN.

It is hereby certified that error appears in the printed specification of the above numbered patent requiring correction as follows: Page 3, first column, line 66, claim 8, strike out the comma after "wax"; and second column, lines 33, 49 and 65, claims 11, 12 and 13 respectively, strike out the word "from"; and that the said Letters Patent should be read with these corrections therein that the same may conform to the record of the case in the Patent Office.

Signed and sealed this 28th day April, A. D. 1936.

(Seal)

Leslie Frazer
Acting Commissioner of Patents.